July 6, 1965 J. R. CUNNINGHAM 3,192,925
DISPOSABLE SYRINGE DEVICE
Filed Aug. 25, 1961 4 Sheets-Sheet 1
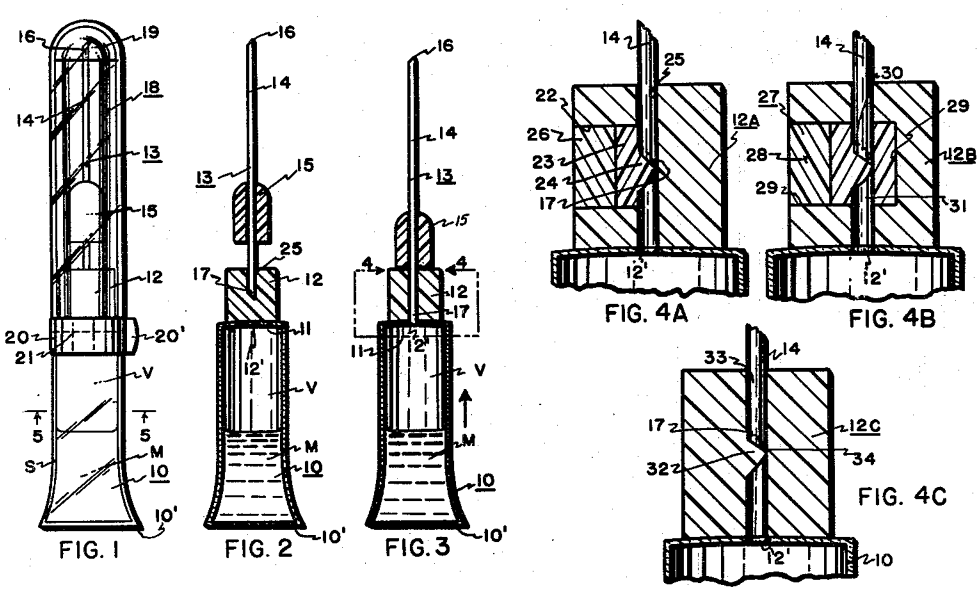
FIG. 1, FIG. 2, FIG. 3, FIG. 4A, FIG. 4B, FIG. 4C
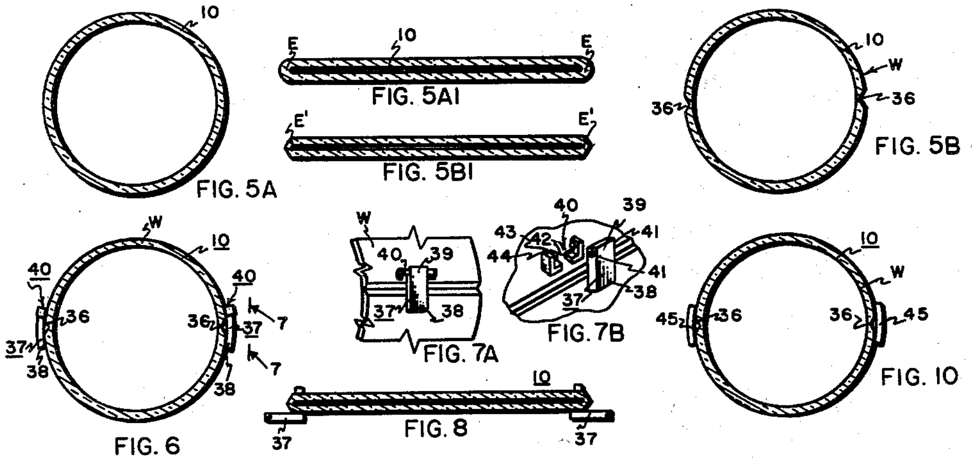
FIG. 5A, FIG. 5A1, FIG. 5B1, FIG. 5B, FIG. 6, FIG. 7A, FIG. 7B, FIG. 8, FIG. 10
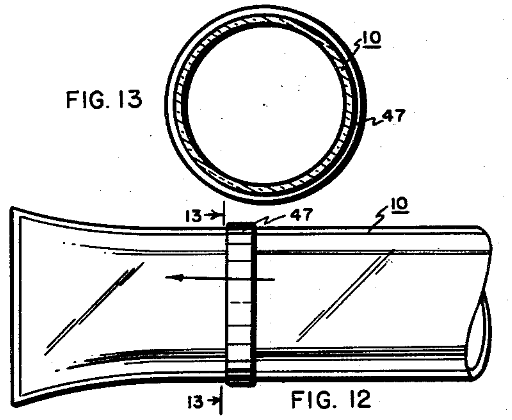
FIG. 13, FIG. 12
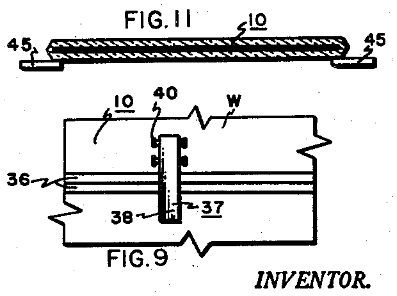
FIG. 11, FIG. 9
*INVENTOR.*
JAMES ROBERT CUNNINGHAM
BY M. Ralph Shaffer
HIS ATTORNEY

*INVENTOR.*
JAMES ROBERT CUNNINGHAM
*BY* M. Ralph Shaffer
HIS ATTORNEY

*INVENTOR.*
JAMES ROBERT CUNNINGHAM
*BY* M. Ralph Shaffer
HIS ATTORNEY

*INVENTOR.*
JAMES ROBERT CUNNINGHAM
*BY* M. Ralph Shaffer
HIS ATTORNEY

United States Patent Office 3,192,925

Patented July 6, 1965

3,192,925

DISPOSABLE SYRINGE DEVICE

James Robert Cunningham, 2288 South 20th East, Salt Lake City, Utah

Filed Aug. 25, 1961, Ser. No. 134,004
12 Claims. (Cl. 128—216)

The present invention relates to syringes and, more particularly, to a new and improved syringe of the disposable type which is designed to give accurate and correct intended injections safely, and this notwithstanding the useage thereof by relatively inexperienced personnel.

An object of the present invention is to provide a conveniently useable, inexpensively manufactured, disposable device for containing and injecting medicine.

A further object of the invention is to provide a syringe type device which may be used as a specimen sampler.

A further object of the invention is to provide a syringe which is suitable for all of these standard types of injections: intra-dermal, sub-cutaneous, hypodermic, intravenous, and intra-muscular injections.

A further object of the invention is to provide a disposable syringe which will be adapted for medicinal packing whether the medicine is to be vacuum packed, packed under normal atmospheric conditions, or sectionally packed, as in the case of diluent and medicament, joinable separation, for example.

An additional object is to provide an improved, disposable type syringe wherein the piston action structure thereof pre-sets extremities of travel of the needle member of the device, thereby accommodating certain safety features and also enabling easy testing to see if the vein has been pierced.

An additional object of the invention is to provide a disposable syringe device which can be easily calibrated and tagged for the exact intended useage to be made thereof.

An additional object is to provide a syringe of the type described wherein, where the presence of air is not desired, the same will be substantially air-free by virtue of saline prepacking the needle of the syringe, packing the syringe container under reduced pressure conditions and rendering negligible if not totally absent any presence of air between the base end of the needle and the container cavity.

A further object of the invention is to provide a method of packaging the device of the invention wherein vacuum packing is facilitated.

Other important objects are to provide a disposable syringe or specimen collecting device which will be extremely safe and accurate to use, even in the hands of inexperienced personnel, and which will insure the avoidance of most if not all sources of contamination, air, and so forth, and this in a unit which can be manufactured for a small expense.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is an elevation of a complete, packaged, syringe according to one form of the present invention.

FIGURE 2 is a vertical section of the structure of FIGURE 1 when the needle cover and wrapping thereof are removed.

FIGURE 3 is a section similar to FIGURE 2 but illustrates the syringe in its operating condition during injection.

FIGURES 4A, 4B, and 4C are enlarged, fragmentary, sectional details taken along the line 4—4 in FIGURE 3 of optional, neck sealing structure which may be utilized in connection with the neck portion of the syringe container.

FIGURE 5A is an enlarged section taken along the line 5—5 in FIGURE 1 and illustrates a preferred section of the container wall.

FIGURE 5B is a view similar to FIGURE 5A but illustrates the configuration when outer, elongate, wall-weakening recesses are provided for the medicinal container.

FIGURE 5A1 illustrates the container of FIGURE 5A in collapsed condition.

FIGURE 5B1 illustrates the container of FIGURE 5B in collapsed condition.

FIGURE 6 is a sectional view similar to FIGURES 5A and 5B, but illustrates support means for the wall weakening recesses of FIGURE 5B.

FIGURE 7A is a fragmentary view taken along the lines 7—7 in FIGURE 6, showing in detail the wall supporting means which may be employed.

FIGURE 7B is a perspective view of the area of FIGURE 7A, illustrating the manner in which the support means snaps open when the user so desires it.

FIGURE 8 is a view of the structure of FIGURE 6, is similar to FIGURES 5A1 and 5B1, but illustrates this time a configuration of the medicinal container structure of FIGURES 6, 7A, and 7B when the container is ultimately collapsed.

FIGURE 9 is an enlarged fragmentary view of the container structure, is similar to FIGURE 7A, but illustrates how a pair of means integral with the wall of container 10 may be used with the support means employed thereby.

FIGURE 10 is a section similar to FIGURE 6 which illustrates optional gripping or support means for supporting the wall of container 10.

FIGURE 11 is a view similar to FIGURE 10, but illustrates the structure when the same has been collapsed after expression of the medicinal matter from the syringe.

FIGURE 12 is an enlarged fragmentary view of the container of the syringe of the present invention, in one form thereof, wherein an annular, ring-like element is used to constrain the container to its greatest interior cross-section, so as to preserve its evacuated character.

FIGURE 13 is a section taken along the line 13—13 in FIGURE 12.

Figure 14:
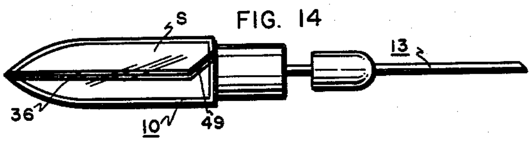
Figure 15:
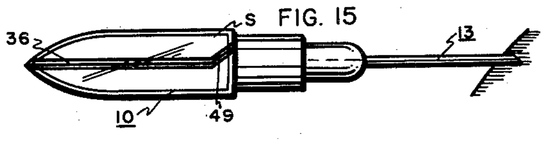
Figures 16, 28, 29, 30, 31, 32, 33, 34, 35:
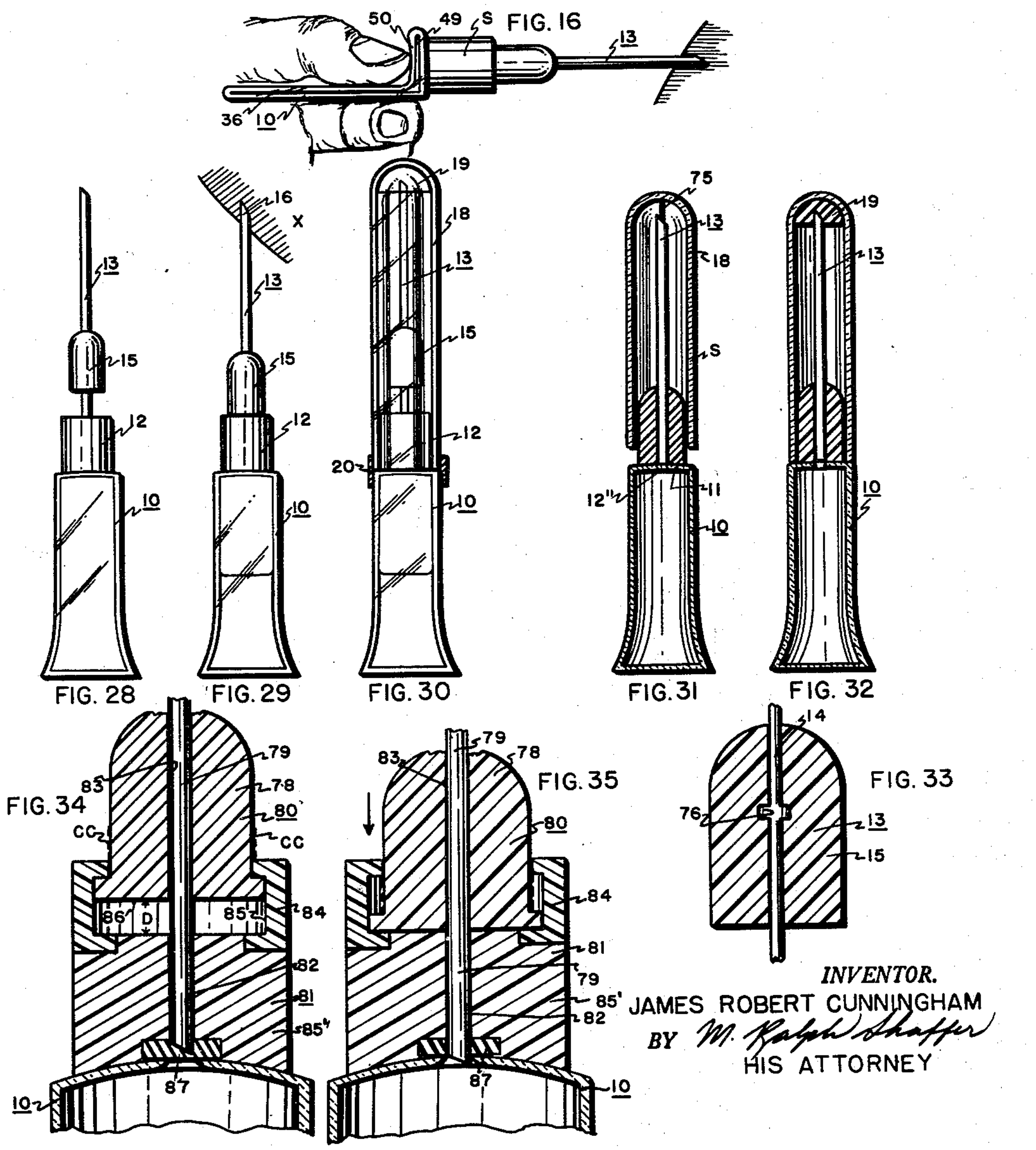

FIGURES 14, 15, and 16 are side elevations of the syringe of the present invention in one form thereof wherein is illustrated in progression the syringe in its inactive state, the syringe upon insertion into patient, and the same after expression has been completed, the last configuration being made advantageous by the unique character of the wall-weakening recesses employed in the medicinal container of the syringe.

Figures 17, 18, 19, 20, 21, 22, 23, 24, 25, 26, 27:
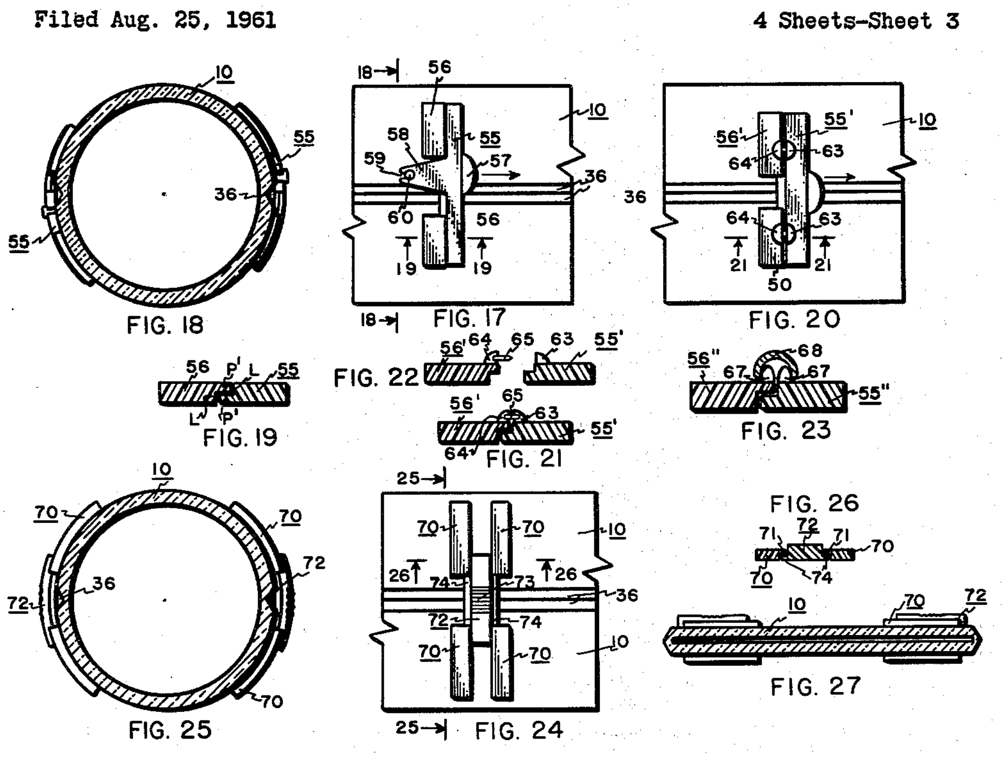

FIGURE 17 is an enlarged fragmentary detail, similar to FIGURE 7A, and illustrates yet another means for stiffening the wall structure of the syringe container prior to use thereof.

FIGURE 18 is a view taken along the line 18—18 in FIGURE 17 in reduced scale with respect thereto, and illustrates the arcuate configurement of the supporting means employed.

FIGURE 19 is a fragmentary section taken along the line 19—19.

FIGURE 20 is a view similar to FIGURE 17 but illustrates optional means for stiffening the wall structure of the container preparatory to use thereof. It will be understood that in the preferred from of the invention, such securement means is used on opposite sides (two sides) of the medicinal container.

FIGURE 21 is a section taken along the line 21—21 in FIGURE 20.

FIGURE 22 is a section similar to FIGURE 21 that illustrates the structure in its open, unconnected condition.

FIGURE 23 is similar to FIGURE 21, illustrating optional means for securing the stiffening members together.

FIGURE 24 is an enlarged fragmentary detail of optional structure employed to stiffen the wall of the medicinal container.

FIGURE 25 is a section taken along the line 25—25 in FIGURE 24, but is shown in reduced scale.

FIGURE 26 is a section taken along the line 26—26 in FIGURE 24.

FIGURE 27 is a view similar to FIGURE 25 and illustrates the structure in its collapsed condition after expression has been completed.

FIGURES 28, 29 and 30 are elevations of the syringe of the invention in one form thereof when the same is used as a specimen collector. FIGURE 28 indicates the syringe device ready for use, FIGURE 25, the device collecting the specimen, and FIGURE 30, the syringe prepared for referral to laboratory facilities.

FIGURES 31 and 32 indicate additional, optional forms of the device, wherein medicinal container piercing means and needle sealing means, respectively, are illustrated.

FIGURE 33 is an enlarged fragmentary section of a portion of the needle and hub combination used in the present invention.

FIGURES 34 and 35 are enlarged fragmentary sections of the device wherein the medial portion thereof is modified so that a controlled piston effect is effected between the needle hub and the container neck of the syringe. FIGURE 34 illustrates the needle structure as being in extended position such that the interior end of the needle is sealed, whereas FIGURE 35 illustrates the needle structure as being depressed, readying the syringe for use.

Figure 36:
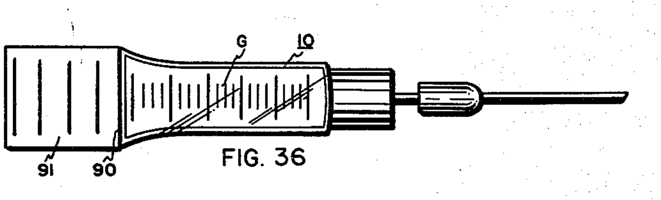

FIGURE 36 is an elevation of the device when the same is calibrated and integrally labeled for patient use.

Figure 37:
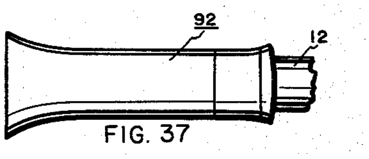
Figure 37A:
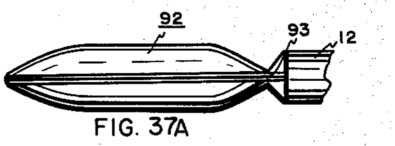
Figure 37B:
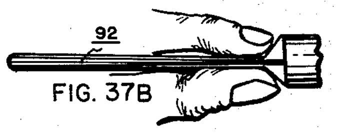

FIGURE 37 is a plan of a portion of the syringe wherein the medicinal container takes a modified and, indeed, a preferred form. FIGURES 37A and 37B are elevations of the structure of FIGURE 37 illustrating the unique constricted-neck construction of the container so as to facilitate complete expression of the medicament therewithin.

Figure 38:
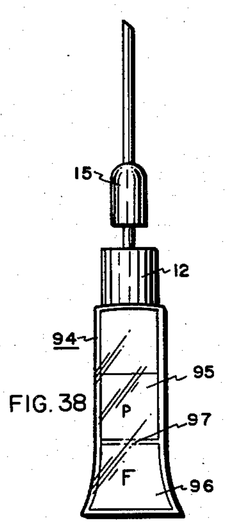

FIGURE 38 is a vertical elevation of an additional form of the syringe of the present invention, wherein the medicament in solid form and its diluent are separated and separately contained within the container, but easily unitable therein by means of releasing a hot-seal thereof.

Figure 39:
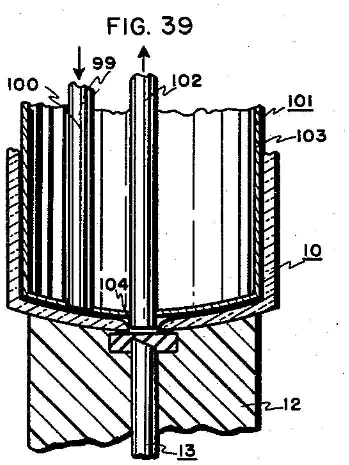
Figure 40:
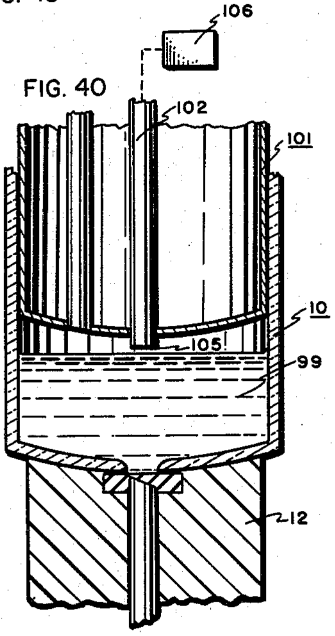
Figure 41:
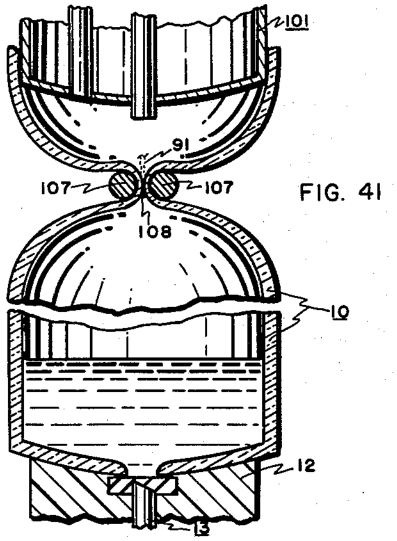

FIGURES 39, 40 and 41 are enlarged, fragmentary, sectional details of a portion of the syringe structure in manufacture, i.e. when the same is being filled with suitable filling structure and subsequently sealed to effect a vacuum-pack of the medicament contained within the syringe.

Figure 42:
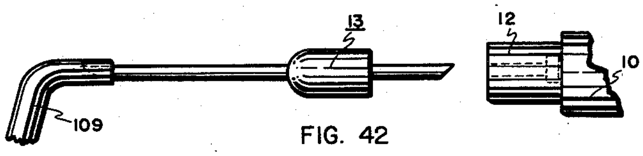
Figure 43:
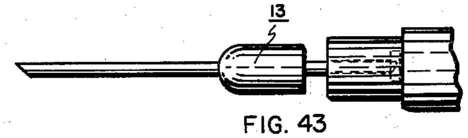

FIGURES 42 and 43 are fragmentary elevations illustrating the manner in which the needle of the syringe is preliminarily filled with a saline solution and the needle deposited into the neck of the medicinal container such that the saline will remain deposited into the needle and the passage between the outer tip of the needle and the medicament container is freed of air and other foreign matter.

In FIGURES 1 through 3, medicinal container 10 is fabricated from a plyable material, preferably of transparent plastic, and preferably includes an upper mounting portion 11 to which neck portion 12 is affixed. Preferably, the upper mounting portion 11 is provided with a centrally disposed aperture 12' which is registered directly beneath needle member 13. Needle member 13 includes a needle 14 and a hub 15 fixedly secured thereto by conventional means. The insertion end 16 of needle 14 is sharpened and angulated as shown. Needle end 17 is preferably also angulated and sharpened as indicated; however, conceivably this end could be squared for certain types of material to be incorporated in neck portion 12. It is desired, however, that this end 17 also be sharpened and easily insertable through the material of neck portion 12 as hereinafter described. Neck portion 12 may take one of several forms, and may be comprised of several types of rubber or plastic materials, for example. A requirement for neck portion 12 is that the material thereof be easily penetratable by needle 14. In FIGURE 2, for example, the neck portion 12 may simply be comprised of a suitable polyurethane material which may be easily punctured, which is soft and cellular in constituency, and resilient to restore an air-tight seal which does not normally conduct air or moisture therethrough in the absence of a definite constrained puncture.

Subsequent figures in the drawings will indicate certain possible modifications for neck portion 12 and shall be discussed hereinafter.

FIGURE 1 illustrates that in the packaging of the subject syringe there may be included a test-tube configured cover 18 which includes a cork, rubber or plastic end 19 (into which the end 16 of needle 13 is inserted and sealed) and also a securing and sealing wrapper member 20 in the form of a "Scotch" or mastic tape, for example, wrapped around end 21 of cover 18 and medicinal container 10. The wrapping means 20 may include a plain thumb tab 20' so that the same may be removed easily from the syringe for the disposal of cover 18. It is conceivable that since, as shown in FIGURE 2, the reverse end of needle 14 is sealed, the portion 19 in cover 18 may be dispensed with, since capillary action and surface tension of any saline solution deposited within the needle 14 will tend to keep the saline solution from dropping out of the needle. However, portion 19 certainly serves an added precaution.

In FIGURE 2 it is seen that the end 17 of needle 14 is partially inserted into neck portion 12 during manufacture. Upon injection of the needle into the patient, then the medicinal container 10 may be urged in the direction of the arrow shown in FIGURE 3 so that the fixed hub 15 of needle member 13 will come in direct contact with neck portion 12 associated with medicinal container 10. During this forward thrusting motion, the needle 17 will be caused to pierce farther down into neck portion 12 until it comes in communication with the aperture 12'.

It will be noted in FIGURE 3 that the abrupt contact of the two adjacent surfaces of hub 15 and neck portion 12 serves as a limit stop for the end 17 of needle 14 so that the same will not protrude into the open cavity formed by medicinal container 10. This insures that a complete expression of the medication will be possible and eliminates any possible weir effect in connection with a protruding needle end.

In FIGURES 4A, 4B and 4C, other types of needle seals are shown incorporated in respective neck portions 12A, 12B and 12C, all corresponding to neck portions 12 in FIGURES 1, 2 and 3 except for the inner seal configuration.

FIGURE 4A illustrates that a side aperture 22 enables the insertion of a sealing element 23, said element preferably having a bore protrusion 24 which extends into and, indeed, seals off the bore aperture 25 of neck portion 12A. In manufacture, the needle 14 may be disposed such that its end 17 is depressed into the sealing portion 23 beneath the dotted line indication shown. Subsequent depression of needle member 13 will cause the needle 14 at end thereof to proceed past either by piercing or by displacing the protuberance 24 of the sealing portion 23 so as, ultimately, to come into registry with aperture 12'. A plug 26 may be fused to or otherwise secured to neck portion 12A so as to retain the sealing means or portion 23 in position. In FIGURE 4B, sealing member 27 is employed, sealing member 27 being disposed within the cavity 28 formed by radial bore 29. Sealing member 27 is potentiated in manufacture by its own radial bores 30 and 31 so that there is merely a medial seal for needle 14.

In FIGURE 4C, the neck portion 12C is simply in itself suitably provided in manufacture with a sealing protuberance 32 which proceeds into and seals off the axial bore 33 of neck portion 12C. The sealing protuberance 32 may be integral with or separate from (but pressed against) bore wall 34. Again, the dotted line configuration indicates the upper edge of the seal.

To recapitulate, the packaged syringe, as shown in FIGURE 1, will be provided by the manufacturer through appropriate channels to the doctor's staff. The syringe will be pre-packed preferably with a saline solution disposed in needle 14. Preferably likewise, it is highly desirous that the medication be vacuum-packed within medicinal container 10. By virtue of the saline packed needle and the vacuum-packed medicine within the composite syringe, there will be substantially no presence of air which could possibly be injected into the patient.

After the wrapper tape 20 and cylindrical cover 18 are removed, the syringe is ready for use. The doctor or nurse will insert end 16 of the needle 14 into the patient by his or her depressing the same, by means of the thumb and fingers, and by either holding onto the hub 15 alone or holding both the hub 15 and neck portion 12.

Upon preliminary insertion of the needle end 16 into the patient, then hub 15 and neck portion 12 are closed together in the manner indicated in FIGURE 3. This may be accomplished by the user either grasping the neck portion 12 and thrusting the same gently toward the patient and against the hub 15, or by the user by thumb and fingers simply squeezing the hub 15 and neck portion 12 together in a manner as not to withdraw the end 16 from the patient.

It will be noted that in either event, that portion of needle 14 between hub 15 and neck portion 12 will not be contaminated by the fingers. Furthermore, it is to be noted that that portion of needle 14 contiguous with end 17 and beneath hub 15 will not come in contact with the medication M disposed within container 10.

It has been mentioned that, preferably, the medication M is vacuum-packed within container 10 in manufacture. This serves a variety of purposes: In the first place the medicine will not be contaminated by foreign matter or the presence of air, and in the second place, there will be an area V of reduced pressure which will cause blood to proceed through the needle 14 in the event that a vein has been struck. In such event, the needle 14 may be withdrawn slightly, preferably without complete ejection from the flesh of the patient, and reinserted, so as to avoid the veins. Subsequently the medicine M may be expressed from the container 10 and into the system of the patient.

It is highly desirous that provision for a vacuum or area of reduced pressure as at V be provided. Normally this is produced by a nurse or doctor "backing off" the plunger of a conventional syringe so as to create an area of reduced pressure—to see if a vein has been pierced. Re-depression of the plunger will contact the medicament of a conventional syringe and contamination will result. It is to be noted that this is impossible in the present invention by the preliminary provision of the evacuated area at V in the manufacture of the device. There need be no "backing off" of any component of the inventor's present syringe.

The syringe thus described is suitable for a variety of types of injections, such as intra-muscular, intra-venal, intra-dermal and also hypodermic injections.

In the case of the modifications of the structure shown in FIGURES 4A, 4B, and 4C, it will be noted that but a very slight pressure will be required to cause the end 17 of needle 14 to pass by the sealing portion of sealing member of neck portion 12A, 12B, and 12C as the case may be. Thereafter, the rearward progression of needle 14 will be very easy and not bothersome to the patient, even though the user closes together hub 15 and neck 12 (A, B, or C) by providing pressure on the neck portion alone.

Preferably, the structure should be so devised that the closing of neck 12 and hub 15 will position the end of needle 14 at aperture 12' so as to avoid the weir effect above mentioned and to insure complete expression of the medication.

FIGURE 5A is a section taken along the line 5—5 in FIGURE 1 illustrating the general and generally preferred cylindrical contour of member 10. The rear end 10' of member 10 will generally be flared outwardly by virtue of the process of manufacture employed, hereinafter explained. Where the configuration of member 10 is such as is illustrated in FIGURE 5A, that a complete expression of the medication therewithin will result in a flattened configuration of member 10 as is illustrated in FIGURE 5A1.

It will be apparent with reference to FIGURES 5A and 5A1 that two requirements which are in apparent opposition are involved in employing a pliable, collapsable container for container 10, when the medication disposed therein is vacuum-packed. In the first place, in order to sustain a reduced pressure at area V in FIGURES 1 to 3, the pliable, collapsable material forming member 10 will have to be quite thick and somewhat rigid. However, this defeats the possibility of complete expression of medication from the container 10 since, if the material is quite thick, then the flattened margins E in FIGURE 5A will be very difficult to form.

Indeed, it will be found that some slight thickening of the plastic or other material may well be needed to form the container wall of container 10. But expression will be aided where wall W of container 10 is purposely weakened along generally diametrically opposite lines. The wall-weakening recesses (e.g.) are indicated at 36 in FIGURE 5B. Thus, assuming there are means provided to maintain the cylindrical configuration of container 10 prior to the expression of the medicament, then, once this restraining force is removed, the weakened areas at 36 in FIGURE 5B will serve not only to aid in the collapse of the container 10 containing the vacuum-packed material, but will also aid in the expression thereof as shown in FIGURE 5B1. This results since the end margins E' will be much less bulky and the space between adjacent walls at the ends much less.

The configuration of FIGURE 5B being desirous, there remains to consider structure which will support the wall of container 10 to a cylindrical configuration prior to collapse of container 10 and expression of the medicine. (The desirability of having a partially evacuated area within container 10 for purposes of testing have been previously mentioned.)

The above leads us to the consideration of FIGURES 6, 7A, 7B and 8, wherein are shown means for supporting this wall W of container 10 at weakened areas 36. This means may take the form of transverse support members 37, having one end 38 bonded or otherwise secured to wall W of container 10, and another end 39 provided with means for cooperating with retaining means 40, the latter being also bonded or otherwise secured to wall W of container member 10. Thus, the support members 37 may each include oppositely disposed depressions 41 (see FIGURE 7B) which cooperate with protuberances 42 and 43 of retainer elements 44. The protuberances 42 and 43 will "fit" into the depressions 41 and by a snap-friction effect will retain the support members 37 in a position as shown in FIGURES 6 and 7A. When the user commences to depress the container 10, then the support elements 37 will automatically snap outwardly and out of engagement with protuberances 42 and 43 so as to assume position as shown in FIGURE 7B; thereupon, the medicament may be fully expressed from the container, and the latter assume it collapsed position as shown in FIGURE 8.

Rather than have merely one gripping or retaining means 40, there may be supplied a pair of such retaining means (comprising four retaining elements 40) as shown in FIGURE 9.

It is further conceivable that support elements 45, as in FIGURE 10, may be loosely bonded to wall W of container member 10 opposite weakened area recesses 36 so that depression of container 10 as illustrated in FIGURE 11 will result in a snapping off of either one end or the other end of elements 45 so as to accommodate the evacuated area within member 10 and aid in expression of the medicament.

Another manner of keeping a container 10 having weakened wall areas 36 from collapsing would be simply to supply an angular ring as illustrated in FIGURES 12 and 13, said ring being designated by the numeral 47.

This ring 47 in FIGURES 12 and 13 will prevent the collapse of the partially evacuated container 10 until said ring is removed in the direction indicated by the arrow in FIGURE 10 so as to be disengaged from container 10.

Upon the removal of the ring, container 10 will tend to collapse and expression of the medicine will be aided thereby.

FIGURES 14, 15, and 16 indicate one type of weakened recess 36, as shown particuarly in FIGURES 14 and 15, these recesses may include an angulated portion 49 (one on each side) which may aid in the complete expression of the medicinal material from container 10. Thus, as shown in FIGURE 16, container 10 when flattened out by the thumb and fingers of the user will actually supply a portion 50 at the tip of the thumb of the user which will aid in expressing completely the medicinal matter from the syringe.

FIGURES 17 through 27 indicate certain other types of support elements which may be used to insure container confirmation having the largest possible cross-sectional area, so as to preserve the reduced pressure characteristic of the interior of the medicinal container. It will be noted from these figures that the support means completely span the recessed weakened areas 36 of medicinal container 10.

In FIGURES 17 through 19 an arcuate, relatively stiff support member 55 is seated underneath and is retained by lugs 56 which overlap thereover as shown in FIGURE 19. Cooperating protrusions P' and indentations L of the respective parts make this possible. Preferably, the support member 55 includes a thumb and finger grasping tab 57 and also a securing portion 58 which may protrude outwardly and have slot 59 to engage button 60, the latter being fixedly disposed and secured to the container 10. Accordingly, when the member 55 is urged to the right in FIGURE 17 in the direction according to the arrows shown, then the protuberance 58 of member 55 releases from button 60 so that member 55 may be withdrawn from its underneath engagement with lugs 56. Thereupon the weakened area 36 becomes unspanned and the container collapses under the reduced pressure enclosure thereof. Preferably, there will be structure such as that shown in FIGURES 17 through 19 on both sides of the container spanning both weakend areas 36.

In FIGURES 20, 21 and 22 is shown alternate structure wherein a support member 55', much similar to support member 55 in FIGURE 17, is now supplied with upstanding protrusions 63. Correspondingly, lugs 56' are themselves supplied with upstanding protrusions 64 which are provided with pins 65. The support member 55' may be easily withdrawn in the direction shown by the arrow in FIGURE 20 so as to release the engagement of pins 65 with their respective protrusions 63 as shown in FIGURE 22. The engaged protrusions 63 and 64, engaged in 65, are shown in detail in FIGURES 20 and 22. There are, of course, other and almost innumerable ways of securing the lugs 56' and support member 55' together. Another way might be simply of supplying protrusions 67 which are spanned by an internally recessed cap 68 as shown in FIGURE 23. This drawing is in reference to the additionally modified support member and lugs 55'' and 56'', respectively.

FIGURES 24 through 27 illustrate yet a further way in which the weakened area 36 disposed on both sides of the container 10 may be spanned. Accordingly, in FIGURE 24 as illustrated, lugs 70 have overlapping portions 71 as shown in FIGURE 26. Correspondingly, there is disposed between the lugs 70 a circumferentially translatable button 72, preferably knurled at 73, and having outer flanges 74 disposed underneath the inwardly directed, protruding flanges 71 of lug 70. The movable member 72 may be friction held by the respective lugs 70 and be translatable in one or two opposite directions therebetween so as to release its spanning of weakened area 36.

When such spanning is released, then the container 10 may be collapsed and the medicinal matter expressed therefrom so as to leave the container in a completely collapsed condition as indicated in FIGURE 27.

By virtue of the reversible nature of the inventor's structure, the syringe may be used for collected marrow specimens from bone marrow, for example, and many other types of specimens. This is illustrated in FIGURES 28, 29 and 30 wherein the syringe of FIGURES 1 through 3 is supplied (see FIGURE 28). The pointed tip 16 of needle member 13 is deposited into member X for the purpose of receiving a specimen theerof. Container 10 will be previously evacuated and this time is of rigid construction or at least made rigid by one of the support means of FIGURES 17 through 27 or FIGURES 6 through 12; hence, by virtue of the reduced pressure in container 10, the syringe will automatically "suck in" the specimen. Before the needle is removed from the specimen the hub 15 should be urged outwardly, as indicated in FIGURE 30, so as to allow the neck seal to close so that the specimen will be completely free of air and other foreign matter. Thereupon the cover 18 will be replaced and secured in place by tape 20. The specimen may then be taken to the laboratory wherein the container 10 may be opened and the specimen withdrawn for tests. Culture media (solid or liquid) may be predisposed within container 10.

FIGURES 31 and 32 indicated additional optional embodiments of the invention wherein entrance into chamber 10 may be blocked either by a cork, plastic, or rubber member 19 into which needle member 13 is imbedded, or where the portion 11 of container 10 is closed at 12'' and container 18 supplied with a wire 75 which is disposed interiorly of needle member 13 and is adapted to punch a hole into portion 11 of container 10.

FIGURE 33 simply illustrates one way in which needle 14 of needle member 13 may be secured to hub 15. As seen in FIGURE 33, the needle 14 may be supplied with an annular or other protuberance 76. When the hub 15 is molded to the needle 14, the protuberance 76 will permanently position the two.

FIGURES 34 and 35 illustrate vertical, longitudinal fragmentary sections of an enlarged portion of a preferred embodiment of the invention which incorporates a type of "piston" action. Hub 78 is made integral with needle 79 to form needle member 80. Neck member 81 has, of course, its central bore 82 (as does hub 78 have central bore 83). However, this time the neck member 81 also includes, for example, an interiorly recessed ring 84 which, in the process of manufacture, is fixedly secured to base portion 85' of neck member 81. The securement will be made after hub 78 of needle member 80 is disposed within the recessed area 85 of annular member 84. Thus, the lower surface 86 of hub 78 will be movable within the distance D. Annular member 84 defines outer and inner limits of the hub. The needle 79 will be sealed by rubber, plastic or other resilient member 87, which is set in and secured to the lower portion 85'. For reliability and self-actuation the needle resistance to its seal should be, preferably, only slightly greater than resistance of the skin to penetration.

When the hub 78 is depressed as indicated in FIGURE 35, then the needle 79 will pierce through sealing member 87. Subsequently, however, the needle and hub combination may be withdrawn so as to restore the seal (provided sealing member 87 is manufactured of a suitable material such as rubber or polyurethane which will close air-tight upon the withdrawal of a piercing article, preferable for all embodiments of this invention).

The structure above described in connection with FIGURES 34 and 35 is deemed highly desirable. Obviously, other types of structure might be incorporated wherein the piston action of the hub 78 relative to neck member 81 is retained. This structure stabilizes the relationship of the needle and needle-hub in a double limit stop arrangement relative to the neck of the container. Further, it allows a selectable withdrawal of the needle member 80, even after the needle 79 has been in communication with the interior of container 10. This will be useful for a number of medical purposes. Finally, it insures that the needle member 80 cannot be completely pulled out inadvertently from its intended position in relation to the rest of the structure. It is also possible that the structure of FIGURES 34 and 35 may be used for giving successive injections, withdrawal being accomplished as shown in FIGURE 34 prior to the ejection of the syringe from a particular patient and return of the needle member 80 as shown in FIGURE 35 for giving a successive injection to the same patient, always avoiding contact wtih air, contamination and other matters.

Where successive usage is not desired, then the hub 78 might be colorcoded at ring CC and the nurses instructed not to use the syringe if the color CC were not completely visible.

FIGURE 36 illustrates that the subject of the present invention may be sophisticated by providing graduating indicia (see G in FIGURE 36) the container 10, and also be incorporated within the sealed ends 90 of container 10 a patient and dosage designating tag 91. Thus, the name and ward or room of the patient, plus intended dosage, might be included on tab 91 so that no confusion can possibly result as to the patient for whom the syringe is intended and the dosage required. This is a very desirous practice. The present practice, unfortunately, is to put a slip of paper simply under each syringe of a tray of syringes and then trust that the syringes will not become disarranged so that dosages are given to the wrong patients. The type of drug contained may also be indicated on tag 91.

FIGURES 37, 37A and 37B indicate optional configurations of a container, the particular configuration shown very much facilitating expression of the container. The container is shown to have a reduced or constricted neck area at 93, enabling a tight closure of the container after expression has been completed as at FIGURE 37B. FIGURE 37 is simply a plan view of the improved container 92. FIGURES 37A and 37B indicate side elevations of the container prior to expression (FIGURE 37A) and when expression is finally completed (FIGURE 37B). Such a configuration, with the weakened wall areas 36, enables a complete and very accurately calibrated expression and graduation of the device.

In FIGURE 38 is illustrated a container 94, associated with the other equipment of the syringe, wherein, for purposes of ensuring long life and avoiding pre-mature chemical or other reactions, the medicant, e.g. medicinal powder or even a dissimilar diluent, 95 is separated from its diluent 96 by means of a light, hot-seam weld 97, possible with polyethylene sheet plastics, for example. Thus, immediately upon (or prior to) injection, the user may simply squeeze slightly with his thumb and finger the fluid portion at 96 so as to break the hot-seam weld at 97 and cause the fluid and powder (at 95) to mix (F and P). Subsequently, the mixture may be injected in the usual manner. It is to be noted that this technique avoids additional interior packets for enclosure within the basic container.

FIGURES 39–41 illustrate fabricating, ideally of polypropylene, and filling the container 10 of the syringe. The medicament 99 is passed through tube 100 of certain filling structure 101 in FIGURES 39, 40 and 41 to fill the container 10. Air evacuation is supplied by provision of tube 102. Both tubes are fixedly secured to a withdrawable, sealing cylindrical plunger 103, substantially air-tight in cooperation with container 10, which is gradually withdrawn, as is shown progressively from FIGURE 39 to FIGURE 41, so as to allow for the complete and air evacuated filling of container 10. The structure 101 is such that tube 102 protrudes down into area 104 of the container so that air will not be entrapped in this region. Accordingly, liquid medicament 99 will be caused to pass through tube 100 in the direction of the arrow in FIGURE 39. Member 103 will fit in a substantial air-tight relationship with the cylindrical container 10. As the medicament flows downwardly through tube 100 and air is evacuated outwardly through tube 102, the container 10 begins to be filled, all this while the structure 101 is gradually being withdrawn. The lower level at 105 of tube 102 should be just above the rising surface of the medicament 99. A vacuum pump 106 may be employed to remove maximum air from tube 102. When the desired medicament level is reached as shown in FIGURE 41, then two heated rod-like elements 107 will be impressed together so as to form a seam-weld thereat. See FIGURE 41. If desired, the patient tag 91 may be included as referred to in FIGURE 36. Subsequently, the filling structure 101 is completely removed and the ends of container 10 suitably trimmed above the hot seam weld area at 108.

FIGURES 42 and 43 illustrate the manner in which needle member 13 may be pre-packed in manufacture with a suitable saline or other innocuous buffered solution. A saline supply hose 109 will be connected to the needle and suitable saline will be disposed through the tube. While the saline supply tube 109 is still connected to the needle member 13, the needle member will be positioned within neck portion 12 associated with container 10. Once the needle member 13 is seated within neck portion 12 of container 10 at its seal (see for example 23 at FIGURE 4A), the supply hose 109 will be disconnected from the needle. The surface tension and capillary action of the saline solution will be sufficient, once the inner end of the needle is sealed, to preclude saline from inadvertently dropping out of the needle member 13. Of course, if desired, an additional, external end seal as at 19 in FIGURE 1 may be employed.

It must be remembered to secure the full advantage of the present invention, so far as the vacuum-packed syringe disclosed is concerned, it is highly desirable that the needle be saline packed so that this source of air and other contamination may be eliminated at its source.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A disposable syringe including, in combination, a collapsible medicinal container, a quantity of medicament vacuum-packed within said container, releasable means for constraining, prior to release, said collapsible medicinal container against collapsing prior to a desired time, needle means affixed to said container but normally sealed from communication with the interior thereof, and means for selectively providing communication between said needle and the interior of said container.

2. A disposable syringe including, in combination, a collapsable medicinal container, a neck portion integral with said container and having a bore directed toward the interior of said container, one of said neck portion and said container being provided with sealing means for isolating said bore from the interior of said container, and a needle member having an injection needle, the diameter of which is equal to that of said bore, seated within said bore of said neck portion and extending outwardly therefrom, and a hub fixedly secured to said needle and normally spaced from but advanceable toward said neck portion, said needle being advanceable rearwardly, upon depression of said hub toward said neck portion, to penetrate at least one of said neck portion and said container at and beyond said sealing means to communicate with the interior of said container, and wherein said container contains a medicament, said medicament being vacuum packed within said container, said syringe including releasable means for constraining, prior to release, said collapsible medicinal container against collapsing prior to a desired time.

3. A disposable syringe including, in combination, a collapsable medicinal container, a neck portion integral with said container and having a bore directed toward the interior of said container, one of said neck portion and said container being provided with sealing means for isolating said bore from the interior of said container, and a needle member having an injection needle, the diameter of which is equal to that of said bore, seated within said bore of said neck portion and extending outwardly therefrom, and a hub fixedly secured to said needle and normally spaced from but advanceable toward said neck portion, said needle being advanceable rearwardly, upon depression of said hub toward said neck portion, to penetrate at least one of said neck portion and said container at and beyond said sealing means to communicate with the interior of said container, and wherein said container contains a medicament, said medicament being reduce-pressure packed within said container, said syringe also including disengageable means for releasably constraining the full, open contour of said container prior to expression of container contents.

4. A disposable syringe including, in combination, a collapsible medicinal container, a neck portion integral with said container and having a bore directed toward the interior of said container, one of said neck portion and said container being provided with sealing means for isolating said bore from the interior of said container, and a needle member having an injection needle, the diameter of which is equal to that of said bore, seated within said bore of said neck portion and extending outwardly therefrom, and a hub fixedly secured to said needle and normally spaced from but advanceable toward said neck portion, said needle being advanceable rearwardly, upon depression of said hub toward said neck portion, to penetrate at least one of said neck portion and said container at and beyond said sealing means to communicate with the interior of said container, and wherein said needle is pre-filled with an innocuous, buffered solution.

5. A disposable syringe including, in combination, a collapsable medicinal container, a neck portion integral with said container and having a bore directed toward the interior of said container, one of said neck portion and said container being provided with sealing means for isolating said bore from the interior of said container, and a needle member having an injection needle, the diameter of which is equal to that of said bore, seated within said bore of said neck portion and extending outwardly therefrom, and a hub fixedly secured to said needle and normally spaced from but advanceable toward said neck portion, said needle being advanceable rearwardly, upon depression of said hub toward said neck portion, to penetrate at least one of said neck portion and said container at and beyond said sealing means to communicate with the interior of said container, and wherein said container is provided with a medial seam to form first and second compartments, said syringe including a medicament of one character disposed in one compartment and a diluent of a different character in the remaining compartment, said container with its seam being so constructed and arranged that pressure exerted upon said remaining compartment will break said seam, to allow said diluent to flow toward and mix with said medicament, without fracturing said container.

6. A disposable syringe including, in combination, a collapsable medicinal container, a neck portion integral with said container and having a bore directed toward the interior of said container, one of said neck portion and said container being provided wth sealing means for isolating said bore from the interior of said container, and a needle member having an injection needle, the diameter of which is equal to that of said bore, seated within said bore of said neck portion and extending outwardly therefrom, and a hub fixedly secured to said needle and normally spaced from but advanceable toward said neck portion, said needle being advanceable rearwardly, upon depression of said hub toward said neck portion, to penetrate at least one of said neck portion and said container at and beyond said sealing means to communicate with the interior of said container, and wherein said container contains a medicament, said medicament being vacuum packed within said container, said syringe including releasable means for constraining, prior to release, said collapsible medicinal container against collapsing prior to a desired time, and wherein said syringe is provided with a contour constraining ring removably disposed about and engagedly encompassing said container.

7. Structure according to claim 3 wherein said container is provided with longitudinal, elongate, recess means for aiding the collapse of said container.

8. A disposable syringe including, in combination, a collapasable medicinal container, a neck portion integral with said container and having a bore directed toward the interior of said container, one of said neck portion and said container being provided with sealing means for isolating said bore from the interior of said container, and a needle member having an injection needle, the diameter of which is equal to that of said bore, seated within said bore of said neck portion and extending outwardly therefrom, and a hub fixedly secured to said needle and normally spaced from but advanceable toward said neck portion, said needle being advancable rearwardly, upon depression of said hub toward said neck portion, to penetrate at least one of said neck portion and said container at and beyond said sealing means to communicate with the interior of said container, and wherein the end remote from the injection end of said needle is embedded in said sealing means, and wherein said needle is prefilled with a buffered solution, said syringe being provided with an elongate needle cover removably secured to said neck portion, said needle cover being provided with piercable means for releasably receiving the injection end of said needle.

9. Structure according to claim 3 wherein said container is provided with longitudinal, elongate, recess means for aiding the collapse of said container, and wherein said recess means are provided with angulatively disposed portions, proximate said neck portion, for contouring said container during expression to deform the same as to provide a container portion transverse and normal with respect to and directly advanceable toward said neck portion.

10. Structure according to claim 3 wherein said container is provided with longitudinal, elongate, recess means for aiding the collapse of said container, and wherein said disengagable means comprises first means secured to said container and removably spanning said recess means and second means releasably engaging said first means.

11. Structure according to claim 3 wherein said container is provided with longitudinal, elongate, recess means for aiding the collapse of said container, and wherein said disengagable means comprises first means fixedly secured to said container on both sides of said recess means, and second means removably secured to and removably spanning said recess means via said first means.

12. A disposable syringe including, in combination, a medicinal container having spaced, elongate, weakened wall areas, a medicament ingredient vacuum packed in said container, needle means affixed to said container but normally sealed from communication with the interior thereof, means for selectively providing communication between said needle and the interior of said container, and releasable means for constraining said container against collapsing prior to release of said releasable means, for expression.

References Cited by the Examiner

UNITED STATES PATENTS

| | | | |
|---|---|---|---|
| 1,676,881 | 7/28 | Anthony | 128—216 |
| 1,687,502 | 10/28 | Marcy | 128—216 |
| 2,371,086 | 3/45 | Watson | 128—216 |
| 2,538,391 | 1/51 | Smith | 128—218 |
| 2,618,263 | 11/52 | Lasko et al. | 128—216 |
| 2,625,157 | 1/53 | Lockhart | 128—216 |
| 2,636,493 | 4/53 | Lockhart | 128—216 |
| 2,661,740 | 12/53 | Hickey | 128—218 |
| 2,667,872 | 2/54 | Smith | 128—216 |
| 2,668,534 | 2/54 | Barradas et al. | 128—216 |
| 2,676,591 | 4/54 | Fox | 128—216 |
| 2,690,179 | 9/54 | Fox | 128—216 |
| 2,727,516 | 12/55 | Lockhart | 128—216 |
| 2,805,662 | 9/57 | Lawshe et al. | 128—216 |
| 2,876,771 | 3/59 | Dunmire | 128—216 |
| 2,888,015 | 5/59 | Hunt | 128—218 |
| 2,895,475 | 7/59 | Cole | 128—272 |
| 2,911,972 | 11/59 | Elinger | 128—216 |

FOREIGN PATENTS

| | | |
|---|---|---|
| 790,220 | 2/58 | Great Britain. |
| 1,171,622 | 10/58 | France. |
| 995,001 | 11/51 | France. |

RICHARD A. GAUDET, *Primary Examiner.*

JORDAN FRANKLIN, RICHARD J. HOFFMAN, *Examiners.*